No. 812,023. PATENTED FEB. 6, 1906.
F. L. DICKSON.
FISHING REEL.
APPLICATION FILED FEB. 21, 1905.
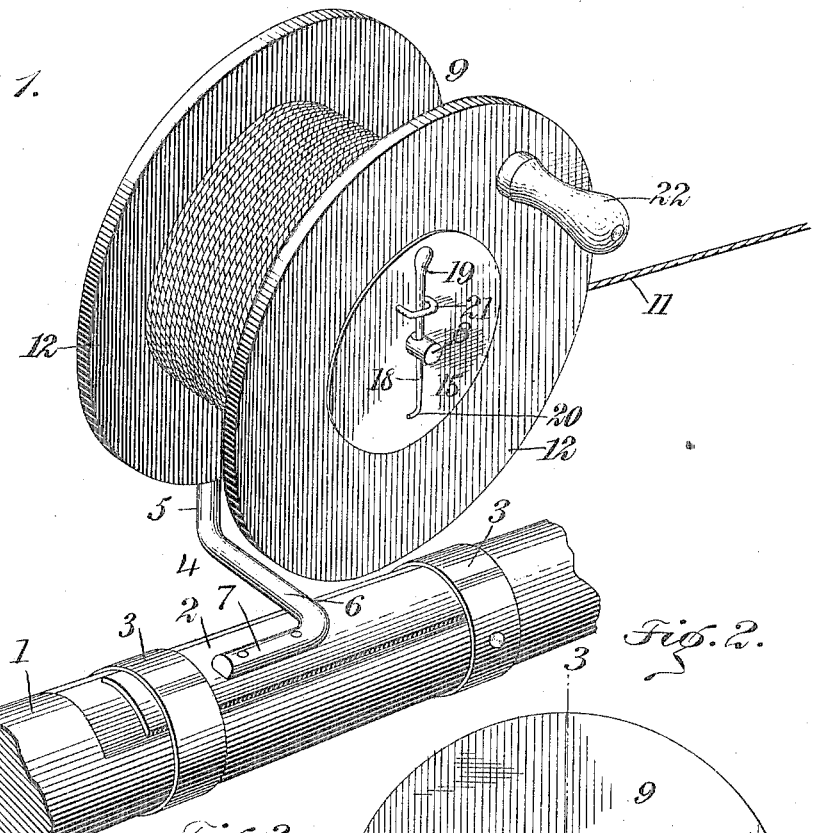
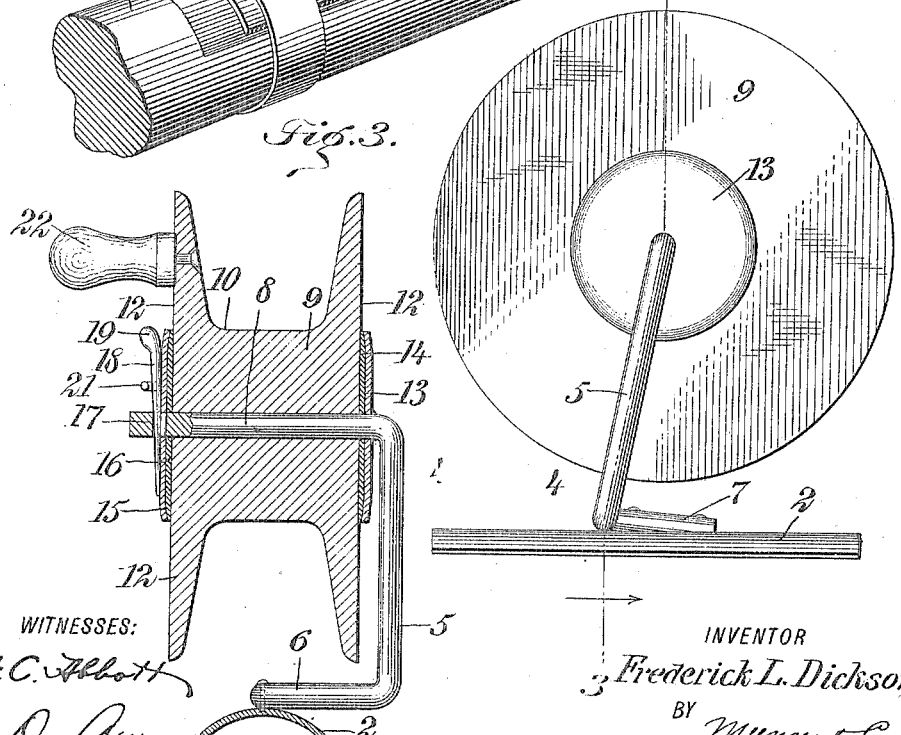
WITNESSES:
INVENTOR
Frederick L. Dickson
BY Munn & C
ATTORNEYS

UNITED STATES PATENT OFFICE.

FREDERICK LINDSAY DICKSON, OF EL PASO, TEXAS.

FISHING-REEL.

No. 812,023.　　　　　Specification of Letters Patent.　　　　　Patented Feb. 6, 1906.

Application filed February 21, 1905. Serial No. 246,686.

*To all whom it may concern:*

Be it known that I, FREDERICK LINDSAY DICKSON, a subject of the King of Great Britain, and a resident of El Paso, in the county of El Paso and State of Texas, have invented a new and Improved Fishing-Reel, of which the following is a full, clear, and exact description.

This invention relates to fishing-reels such as are used by anglers for "playing" a fish after it has been struck.

The object of the invention is to produce a reel of simple construction which is provided with means for controlling at any instant the tension of the line in unwinding.

Reference is to be had to the accompanying drawings, forming a part of this specification, in which similar characters of reference indicate corresponding parts in all the views.

Figure 1 is a perspective view of a portion of a fishing-rod with my reel attached thereto. Fig. 2 is a side elevation of the reel detached from the rod, and Fig. 3 is a vertical section taken substantially upon the line 3 3 of Fig. 2.

Referring more particularly to the parts, 1 represents a portion of a fishing-rod near the butt or main section, where reels are usually attached. The reel itself comprises a saddle-plate 2, which is bent, as shown most clearly in Fig. 3, so as to conform to the rounded surface of the rod, and this saddle-plate is maintained in position by means of bands or rings 3, which encircle the rod, as shown. Preferably at substantially the middle point on the saddle-plate 2 I attach a bracket 4. This bracket 4 is preferably formed out of a stout piece of round metal, such as a brass rod. Its body 5 is preferably disposed substantially at right angles to the direction in which the rod 1 extends. Integral with the body 5 a foot 6 is formed, which terminates in a laterally-disposed shank 7, which is securely riveted to the saddle 2, as shown. Beyond the body 5 the bracket is formed with a lateral extension or arm 8, upon which the body of the reel 9 is rotatably mounted, as shown. It will appear that the arm 8 is disposed in a direction substantially at right angles to that of the rod 1, and, furthermore, by reason of the offset at the foot 6 the central plane of the reel-body substantially coincides with a vertical plane passing through the axis of the rod 1.

The body of the reel is preferably substantially of the form shown, and it may be of wood or metal, as found desirable. The body of the reel is preferably of simple form, so that it presents a reduced neck 10, adapted to receive the line 11 in the usual manner, and the end faces 12 of the reel are preferably substantially flat or plane, as shown.

Upon the extremity of the arm 8 which lies adjacent to the body 5 of the bracket a head or collar 13 is rigidly attached by solder or similar means, and upon the inner face of this collar 13 a washer 14, preferably of leather or rubber, is placed, which washer rests upon one of the faces 12 and constitutes a stop to limit the inward movement of the reel-body. When the reel-body is mounted in position, the outer extremity of the arm 8 will project beyond the outer face of the reel, so as to enable a metal collar 15 to be mounted loosely upon the same, as shown. This metal collar 15 is preferably very similar in function to the collar 13 aforesaid; but it is not rigidly attached to the arm. Under the collar 15 a leather or rubber washer 16 is carried, which is substantially similar to the leather or rubber washer 14 aforesaid. As indicated, both the collars 13 and 15 are preferably bent somewhat, so as to present concave inner faces.

Just beyond the collar 15 the projecting extremity of the arm 8 is provided with a substantially vertically disposed bore or opening 17. In this opening 17 a pin 18 is mounted, the body whereof tapers throughout its length, as shown, between an enlarged butt 19 and a bent extremity or hook 20, and upon the outer face of the collar 15 a retainer or elongated eye 21 is attached, the said eye presenting substantially the appearance of a staple having an elongated cross-bar. If found desirable in practice, I may employ a rivet or pin in the extremity of the pin 18 instead of the hook 20.

The parts are assembled in the manner indicated most clearly in Figs. 1 and 3. It will appear from an inspection of these figures that the pin 18 is inserted through the eye 21 while the said eye is held above the opening 17. The hooked extremity 20 will then be manipulated so as to pass the same through the fixed opening 17. From this arrangement evidently the pin 18 affords means for locking the collar 15 against rotation when the body of the reel is rotated in the usual manner by means of its handle 22. The pin of course affords means for retaining the reel upon the arm and would do this even though it were not tapered. By reason of the fact that the pin 18 is tapered it affords means for adjusting the tension upon the faces 12 at the washers 14 and 16. When a fish has been struck and has begun to run with the line, he may be checked by forcing in the pin 18, so that a substantial frictional resistance is afforded to the rotation of the reel. At any instant desired the pin may be loosened. The slack of the line may be taken in at any time, of course, by rotating the reel.

It should be said that the hook 20, formed upon the extremity of the pin 18, operates to prevent the pin from falling out accidentally.

The reel described above is evidently very simple in construction and affords means for controlling the tension in the line in a simple manner. There are no complicated parts which would be liable to get out of order and which could not be replaced if broken during a fishing expedition.

Having thus described my invention, I claim as new and desire to secure by Letters Patent—

1. In a device of the class described, in combination, a bracket having a body adapted to be attached to a rod, said body having a laterally-disposed arm integral therewith, a disk collar of enlarged diameter rigidly attached to said arm adjacent to said body, and a reel rotatably mounted on said arm and abutting against said collar.

2. In a device of the class described, in combination, a bracket adapted to be attached to a rod and presenting a laterally-disposed arm, a reel rotatably mounted upon said arm, said arm having an extension beyond said reel with an opening therethrough, a collar mounted upon said arm adjacent to the face of said reel, and a tapered pin engaging said collar and preventing rotation thereof, said tapered pin passing movably through said opening and retaining said reel.

3. In a device of the class described, in combination, a bracket adapted to be attached to a rod and presenting a laterally-disposed arm with an opening near the extremity thereof, a reel rotatably mounted upon said arm, a collar mounted upon said arm adjacent to said opening, said collar having an eye on the outer face thereof, and a tapered pin passing through said eye and through said opening.

4. In a device of the class described, in combination, a bracket adapted to be attached to a rod and presenting a laterally-disposed arm with an opening at the extremity thereof, a reel rotatably mounted upon said arm, a collar mounted upon said arm adjacent to the outer face of said reel, said collar presenting an eye on the outer face thereof, and a tapered pin having a hooked extremity passing through said eye and said opening, said pin affording means for retaining said reel and locking said collar against rotation.

5. In a device of the class described, in combination, a bracket adapted to be attached to a rod and presenting a laterally-disposed arm, a collar fixed near the inner extremity of said arm, a reel mounted rotatably upon said arm and abutting on said collar, said arm projecting beyond said reel and having an opening therethrough, a second collar mounted upon said arm and abutting on the outer face of said reel, said second collar having an eye on the outer face thereof, and a pin passing through said eye and said opening, said pin affording means for locking said reel.

In testimony whereof I have signed my name to this specification in the presence of two subscribing witnesses.

FREDERICK LINDSAY DICKSON.

Witnesses:
MAHLON W. WILKERSON,
HORACE B. STEVENS.